United States Patent [19]

Nicks et al.

[11] 3,920,597

[45] Nov. 18, 1975

[54] PAINT COMPOSITIONS AND METHOD OF THEIR PRODUCTION

[75] Inventors: Peter Francis Nicks, Maidenhead; William Anthony Ryan, Finchley, both of England

[73] Assignee: Imperial Chemical Industries Limited, London, England

[22] Filed: Aug. 16, 1974

[21] Appl. No.: 498,214

[30] Foreign Application Priority Data

Sept. 10, 1973 United Kingdom............... 42430/73

[52] U.S. Cl......... 260/22 R; 117/161 K; 260/22 CB; 260/33.6 R; 260/40 R
[51] Int. Cl.²............................................ C09D 3/64
[58] Field of Search............ 260/22 R, 22 A, 22 CB, 260/33.6 EP:33.6 R, 32.6 R, 30.8 R

[56] References Cited
UNITED STATES PATENTS

| | | |
|---|---|---|
| 3,234,161 | 2/1966 | Snelgrove et al. .............. 260/29.6 R |
| 3,580,880 | 5/1971 | Clarke et al. .................. 260/29.6 R |
| 3,691,123 | 9/1972 | Clarke et al. .................. 260/33.6 R |
| 3,759,864 | 9/1973 | Nicks ............................. 260/33.6 R |
| 3,804,787 | 4/1974 | Nicks et al. ...................... 260/22 R |

*Primary Examiner*—Ronald W. Griffin
*Attorney, Agent, or Firm*—Cushman, Darby & Cushman

[57] ABSTRACT

A method of producing a non-aqueous paint composition comprising a pigmented solution of a water-insoluble film forming resin in water-immiscible liquid in which the pigment is treated with a drying oil modified alkyd resin containing more than 50% by weight of a hydrophilic moiety derived from a poly(ethylene glycol) of molecular weight 400–1500 and there is also incorporated a compound which is soluble in the paint and which in water has detergent properties.

10 Claims, No Drawings

PAINT COMPOSITIONS AND METHOD OF THEIR PRODUCTION

This invention relates to a method of producing paints based on a solution of resin in a water-immiscible diluent, more particularly to the production of decorative paints which are emulsifiable in water. The invention also relates to improved decorative paints.

In our U.S. appl. Pat no. 3,804,787 we have described and claimed a method of producing solvent borne paints which are emulsifiable in water in the presence of a synthetic detergent of the type used for domestic purposes, for example sodium dodecylbenzene sulphonate. Such a paint may easily be removed from an applicator, for example a brush, by treatment of the latter with an aqueous solution of detergent. The method in question is directed to the production of a paint composition which comprises a pigmented solution of a water-insoluble filmforming base resin in a water-immiscible liquid, the solution of base resin being completely emulsifiable in an aqueous synthetic detergent solution when the pigment is absent but incompletely co-emulsifiable therein with pigment when the pigment is present and the method is characterized by the feature that one of the steps involved comprises treating at least a proportion of the pigment in dispersion in a water-immiscible liquid with an auxiliary resin which (*a*) is co-emulsifiable in the aqueous detergent solution with the pigment when dissolved in the water-immiscible liquid of the paint composition and (*b*) is preferentially adsorbed by the pigment from a solution of both the base resin and the auxiliary resin in the water-immiscible liquid of the paint composition. The auxiliary resin should also be compatible with the base resin in that the two resins form only one phase when mixed in any proportions. The full disclosure of the above mentioned application is incorporated herein by this reference thereto.

One class of suitable auxiliary resins for use in the above process comprises drying oil-modified alkyd resins which contain hydrophilic groups derived from poly(ethylene glycol) moieties of molecular weight 100–5000. Particularly suitable resins of this class are stated to be those which contain 10–50% by weight of a poly(ethylene glycol) moiety of molecular weight 400–1000. It is preferred to use such auxiliary resins in conjunction with base resins which are also of the drying oil-modified alkyd type.

We have now found that if in the above process there is used as the auxiliary resin a drying oil-modified alkyd resin containing more than 50% by weight of a poly(ethylene glycol) moiety of molecular weight 400–1500, and there is also incorporated in the paint composition a compound having detergent properties, the resulting paint is emulsifiable in plain water, as distinct from a pre-formed detergent solution.

According to the present invention, therefore, we provide a method of producing a non-aqueous paint composition, comprising a pigmented solution of a water-insoluble film forming base resin in water-immiscible liquid, which is a modification of the method described in U.S. Pat. No. 3,804,787 and wherein at least a proportion of the pigment is treated in dispersion in a water-immiscible liquid with an auxiliary resin which is a drying oil-modified alkyd resin containing more than 50% by weight based on the total weight of the resin of a hydrophilic moiety derived from a poly(ethylene glycol) of molecular weight 400–1500, the auxiliary resin being used in a proportion of not less than 1% by weight based on the total resin content of the paint composition, and wherein the process also includes the further incorporation into the paint composition in an amount of 1–10% by weight based on the total resin content of the paint of a compound which is soluble in the solution of base resin in water-immiscible liquid and which in water has detergent properties.

Preferably the base resin is a drying oil-modified alkyd resin.

The invention also provides improved paints produced by the process herein described and paint additives herein referred to as auxiliary resins.

The term "paint" is used herein to denote a composition comprising pigment and a solution of a film-forming resin in a water-immiscible diluent.

By "the base resin" we mean that resin which is normally responsible for the main film-forming characteristics of the paint, and this resin may be present in any proportion up to 99% by weight of the total resin content of the paint. The base resin may comprise more than one film-forming material, for example it may be a mixture of two or more drying-oil-modified alkyd resins. It is also within the scope of the present invention to employ a mixture of one or more such alkyd resins with minor proportions of resins of other types, for example polyurethane resins or polyamide resins for the purpose of imparting thixotropic properties to the paint. Drying oil-modified alkyd resins suitable for use in the process of the invention as base resins are any of such resins described in the earlier application and more generally any of such resins conventionally used in the coatings art.

As already stated, the auxiliary resin as hereinbefore defined must be present in a proportion of not less than 1% by weight of the total resin content of the paint; preferably it is present in a proportion of not less than 5% by weight, and even more preferably in a proportion of 7.5–15% by weight of the total resin content. In certain cases it may be desirable to employ higher proportions than 15% of the auxiliary resin for example up to 30%, and exceptionally the proportion used may even exceed 50% by weight of the total resin content of the paint.

As in the case of the auxiliary resins more broadly defined in the earlier application, the auxiliary resins hereinbefore defined as being suitable for use in the present process contain chemical groups which on the one hand enable them to associate with the pigment surface and which on the other hand promote emulsification of the pigment in water in the presence of a detergent compound. The auxiliary resins as herein defined also possess the necessary property of being preferentially adsorbed by the pigment from a solution in the water-immiscible liquid of the paint composition of both the base resin and the auxiliary resin. Confirmation that the auxiliary resins employed in the present process do possess these required characteristics may be obtained by subjecting the resins to the emulsification and adsorption tests which are described in the specification of the earlier application.

The poly(ethylene glycol) moieties may, for example, be introduced into the auxiliary resin by reacting a hydroxyl-terminated poly(ethylene glycol) with a complementary reactive group, e.g. a carboxyl group, in a preformed conventional drying oil-modified alkyd resin. Alternatively, a hydroxyl-terminated poly(ethylene glycol) may be employed as one of the initial components in a condensation reaction, together with the other components normally employed in the preparation of an alkyd resin. The auxiliary resin must contain more than 50% by weight based on the total weight of resin, and should preferably contain up to 90% by weight, of a moiety of poly(ethylene glycol), optionally etherified, the range of molecular weight of the moiety being 400–1500. A preferred range of molecular weight of the poly(ethylene glycol) moiety is 600–800. In general the auxiliary resins containing moieties of poly(ethylene glycol) are of relatively low acid value, preferably less than 30mg. KOH/g. The acid value of the base resin is also preferably less than 30mg. KOH/g. Preferably trimellitic anhydride is employed as one of the initial components in the alkyd condensation reaction.

Pigments, and also extenders and fillers, suitable for use in paint compositions made according to the invention are those which are described for use in the process of the earlier application. Suitable pigments include, for example, titanium dioxide, the iron oxides, whether black, yellow, red or brown; chrome oxide green; phthalocyanine blue; phthalocyanine green; red lead; cobalt blue; graphite; vegetable carbon black; mineral carbon black: metallic aluminium; metallic lead; metallic zinc; white lead sulphate, which lead carbonate; zinc oxide. Suitable extending pigments and fillers include barium sulphate; calcium sulphate; calcium carbonate; magnesium carbonate: calcium silicate; magnesium silicate; and silica.

The term "water-immiscible liquid," as used herein with reference to the liquid in which the base resin is dissolved, means either a single liquid chemical entity which forms a separate phase on admixture with water or a mixture of two or more such liquids. The presence of admixed liquids which are water-miscible, even though they may not affect the water-immiscibility of the base resin solvent medium as a whole, is excluded. Suitable water-immiscible liquids include a wide range of aliphatic and aromatic organic liquids such as esters, ketones and hydrocarbons; we are particularly concerned with aliphatic hydrocarbons which are commonly used in the formulation of decorative paints and which may boil in the range 100°–300°C. A particularly suitable hydrocarbon is commercially available white spirit of boiling range 140°–200°C which is predominantly aliphatic hydrocarbon but which contains up to 15% of aromatic hydrocarbon.

In performing the process of the invention, the pigment may be treated in dispersion in water-immiscible liquid with the auxiliary resin in the absence of base resin or in admixture with a proportion of the base resin. The pigment may also be treated with auxiliary resin after the pigment has been treated with base resin. In this last case the full effect of the auxiliary resin on the emulsification of the paint is only realized when the preferential adsorption of the auxiliary resin has taken effect, i.e., after the paint has been stored, for example after a storage period of up to 1 month. It may be desired to treat only a proportion of the pigment in the paint composition according to the present process, the remainder of the pigment being added without such treatment. Alternatively, the pigment may be treated with auxiliary resin in a separate operation and stored for use as required in making the paint composition.

The process of the present invention also requires the incorporation into the paint composition of a compound exhibiting detergent properties in water and which is soluble in the solution of base resin in water-immiscible liquid. This compound may be a synthetic detergent such as one of the types well known for domestic use, for example a non-ionic surfactant of the ethylene oxide condensate type e.g. ethylene oxide condensate/alkyl phenol, such as nonylphenol condensed with 8 moles of ethylene oxide, or an anionic surfactant such as sodium dodecylbenzene sulphonate or sodium dioctylsulphosuccinate. It may be incorporated in the paint composition at any convenient stage, for example at the stage of blending in the pigment which has been treated with the auxiliary resin. Alternatively, the detergent compound may be provided by a further addition of auxiliary resin containing poly(ethylene glycol) moieties as hereinbefore described; if desired, such further addition of the auxiliary resin may be combined with the addition of a synthetic detergent as just mentioned. The total amount of the detergent compound used (not taking into account the auxiliary resin used to treat the pigment) is in the range 1–10% by weight based on the total resin content of the paint; preferably the amount lies in the range 1–5% by weight of the total resin content. In the case where the detergent compound consists of or includes additional auxiliary resin, that additional resin is preferably not included with the main charge of auxiliary resin at the pigment treatment stage but is incorporated into the paint composition after the initial treatment with auxiliary resin, for example at the stage of blending in the treated pigment.

The present process may be used to produce a wide range of paints, for example gloss, semi-gloss, matt, undercoat and primer paints, including paints which are of modified structure, for example those having non-Newtonian flow characteristics. It is particularly applicable to the production of paints which are normally applied by brush or roller, and it confers on such paints the very valuable property that surplus paint can readily be removed from the brush or roller simply by washing the latter in a stream of plain, warm water, as for example from a tap. The added convenience of operation which is thereby achieved will be immediately apparent, especially in the domestic decoration field. In most cases the incorporation into the paint composition of the necessary proportions of auxiliary resin and detergent compound has little or no adverse effect on the other paint properties of the compositions.

The invention is illustrated but not limited by the following Examples, in which parts and percentages are by weight unless otherwise stated.

EXAMPLE 1

Preparation of Auxiliary Resin

A poly(ethylene glycol) modified alkyd resin was prepared as a 96% solids solution in xylene from poly(ethylene glycol) or molecular weight 600, trimellitic anhydride, pentaerythritol, and tall oil fatty acids in the molar ratios 0.61/2.82/1.67/3. The first two ingredients were pre-reacted and then condensed with the other ingredients to an acid value of 20mg. KOH/g and a viscosity of 30 secs. BT (bubble tube) at 25°C (96% solids in xylene). The alkyd resin so obtained contained 60% poly(ethylene glycol) moieties and 30% fatty acids.

Preparation of a Base Resin

A base resin was prepared as a 75% solids solution in white spirit from linseed oil fatty acids, phthalic anhydride, glycerol and pentaerythritol in the molar ratio 3/2/1/1 and was condensed to an acid value of 15mg. KOH/g and a viscosity of 10 secs BT at 25°C (75% solids solution in white spirit).

The auxiliary resin solution was found to be readily emulsified in water whereas the base resin solution was completely non-emulsifiable.

Preparation of a gloss paint

A full gloss paint was prepared by dispersing 175g of rutile titanium dioxide in a mixture of 10g of the auxiliary resin solution described above, 25.6g of the base resin solution described above and 28g of while spirit in a sand grinder. To this millbase was added with stirring a further 20g of the auxiliary resin solution, 192g of the base resin solution, 1g of cobalt naphthenate (6% cobalt), 10g of calcium napthenate (4% calcium) and 15g of lead naphthenate (24% lead). The paint was thinned with 30g of white spirit to a viscosity of 4 poise measured at 25°C and 10,000 secs. $^{-1}$.

The ease of emulsification of this paint in detergent solution and in plain, warm water respectively was then assessed. Two paint brushes A and B having a 2 inch width of bristles were filled with the paint, ensuring that the paint was thoroughly worked into the stock of each brush. Each brush was allowed to dry for 30 minutes. Brush A was then cleaned by being agitated vigorously in a warm (40°C) solution of 3.3g sodium dodecyl benzene sulphonate in 500 mls of water. Brush B was cleaned by being agitated vigorously in warm water (40°C).

In both cases the paint was readily emulsified and could be completely removed from the brush.

A similar paint prepared as described above but in which the auxiliary resin was replaced by its equivalent weight of base resin (calculated on non-volatile content) did not show any tendency to emulsify in either detergent solution or warm water, nor could it be cleaned from a brush, when tested as above.

EXAMPLE 2

A gloss paint was prepared from the auxiliary resin and base resin described in Example 1 in the following manner. 175g of rutile titanium dioxide was dispersed in 15g of the auxiliary resin solution, 25g of base resin solution and 28g of white spirit. To this millbase was added 2.5g of dodecyl benzene sulphonic acid sodium salt dissolved in 205g of base resin solution, 1g of cobalt napthenate, 10g of calcium naphthenate and 15g of lead naphthenate. The paint was thinned to 4 poise at 25°C and 10,000 secs. $^{-1}$ with 33g of white spirit.

The ease of clean-up of a 2 inch brush was assessed by the method described in Example 1. The paint was easily emulsified in the detergent solution described in Example 1 and also in warm water; brush A could be readily cleaned in the detergent solution and brush B in warm water. A film 0.004 inch thick spread on glass dried in 16 hours and gave a gloss value of 98 when measured with a 45° gloss meter.

EXAMPLE 3

A white gloss paint was prepared by dispersing 175g of rutile titanium dioxide in 17g of the auxiliary resin solution of Example 1, 25g of base resin solution of Example 1 and 28g of white spirit. To this millbase was added 205g of base resin solution in which was dissolved 3.8g of sodium dioctyl sulphosuccinate, 1g of cobalt naphthenate, 10g of calcium napthenate 15g of lead naphthenate, and 50g of white spirit to thin the paint to a viscosity of 2.5 poise at 25°C and 10,000 secs. $^{-1}$. The paint thus obtained could be readily emulsified both in detergent solution as in Example 1 and in warm water. Similarly it could be cleaned from brushes in both detergent solution and warm water.

EXAMPLE 4

Comparative Preparation of Auxiliary Resin

An auxiliary resin was prepared by reacting pentaeryrithritol, glycerol, poly(ethylene glycol) of molecular weight 600, trimellitic anhydride and tall oil fatty acids in the molar ratio 1/1/2/2/5 until an acid value of 20mg. KOH/g was obtained. The resin was thinned to 75% solids in white spirit and contained 38.3% poly(ethylene glycol) moieties.

Preparation of Gloss Paint

A gloss paint was prepared by dispersing 175g of rutile titanium dioxide in 19g of the auxiliary resin solution described in this Example, 26g of the base resin solution described in Example 1 and 28g of white spirit. To this dispersion was added 167g of the base resin solution, 19g of a 30% solution of sodium dioctyl sulphosuccinate dissolved in the base resin solution, 1g of cobalt naphthenate, 10g of calcium naphthenate and 15g of lead naphthenate. The paint was thinned to 3 poise at 25°C and 10,000 secs. $^{-1}$ with 48g of white spirit.

The paint was tested as described in Example 1. It was found to be emulsified readily in detergent solution and brush A could be cleaned easily in that solution. The paint was not, however, emulsifiable in plain warm water and attempts to clean brush B with warm water alone led to the deposit upon the bristles of a sticky residue.

EXAMPLE 5

A blue gloss paint was prepared by dispersing 38g of rutile titanium dioxide, 12g of the Colour Index pigment Blue 15 and 1.25g of carbon black in 19g of the auxiliary resin solution described in Example 1, 15.7g of the base resin solution described in Example 1 and 17g of white spirit. To this millbase were added 7.55g of sodium dioctyl sulphosuccinate dissolved in 288g of the base resin solution, 1.7g of cobalt naphthenate, 11.75g of lead naphthenate and 25.6g of calcium naphthenate, together with 45g of white spirit to give a paint having a viscosity of 2.5 poise at 25°C and 10,000 secs. $^{-1}$.

Brushes filled with this paint and tested as described in Example 1 could be cleaned readily in both the detergent solution and warm water.

EXAMPLE 6

Preparation of Auxiliary Resin

A poly(ethylene glycol) modified alkyd resin was prepared as a 94% solids solution in xylene from pentaerythritol, polyethylene glycol 600, phthalic anhydride and tall oil fatty acids in the molar ratios 0.6/3.0/2.3/3.0. The resin was condensed to an acid value of 18.7mg KOH/g and a viscosity of 1.8 secs BT at 25°C when tested as a 75% solids solution in aliphatic hydrocarbon (boiling range 150°–200°C).

Preparation of Gloss Paint 159 parts of rutile titanium dioxide and 2.5 parts of zinc oxide were dispersed in a solution of 48.1 parts of the above auxiliary resin dissolved in 38.5 parts of aliphatic hydrocarbon (boiling range 150°–200°C).

3.7 parts of sodium dioctyl sulphosuccinate were dissolved in 176 parts of the base resin described in Example 1 together with 14.1 parts of lead naphthenate (24% Pb), 1.15 parts of cobalt naphthenate (6% Co) and 7.0 parts of calcium napthenate (5% Ca) and the blend added with stirring to the millbase. When thoroughly mixed 10 parts of dipentene were added and the paint thinned to a viscosity of 4 poise measured at 25°C and 10,000 secs. $^{-1}$ by the addition of 17 parts of white spirit.

A similar paint was prepared in which the sodium dioctyl sulphosuccinate was replaced by an equivalent weight of disodium N-octodecyl sulphosuccinamate (added as 35% solution in water).

The paints contained 25% by weight of the total resin (non volatiles) as the auxiliary resin and 2% by weight of total resin as the sulphosuccinate.

The ease of clean up of a 2 inch brush when filled with these paints was assessed by the method described in Example 1. Both paints could be cleaned very readily from brushes in either warm water or the detergent solution described in Example 1.

EXAMPLE 7

Gloss paints similar in composition to that of Example 2 were prepared but using the following detergents instead of sodium dodecyl benzene sulphonate:

Ammonium nonylphenol ethylene oxide sulphate (Perlankrol FF)
Alkylolamide/ethylene oxide condensate (Ethylan CH)
Poly(ethylene glycol 600) oleate (Ethylan A6)
Sodium aryl alkyl sulphonate (Atlas G3300)
Sodium dioctyl (and dihexyl) sulphosuccinate (Aerosol OT and MA)
N-octadecyl sulphosuccinamate
Sodium lauryl sulphate All of these detergents allowed excellent removal of paint from a paint brush by the test of Example 1.

What we claim is:

1. In a method of producing a non-aqueous paint composition, comprising a pigmented solution of a water-insoluble film forming base resin which is a drying oil-modified alkyd resin in water-immiscible liquid, the improvement wherein (1) at least a proportion of the pigment is treated in dispersion in a water-immiscible liquid with an auxiliary resin which is a drying oil-modified alkyd resin containing more than 50% by weight based on the total weight of the resin of a hydrophilic moiety derived from a poly(ethylene glycol) of molecular weight 400–1500, the auxiliary resin being used in a proportion of not less than 1% by weight based on the total resin content of the paint composition, and (2) there is also incorporated into the paint composition, after the treatment of the pigment with said auxiliary resin, an amount of 1–10% by weight based on the total resin content of the paint of a compound which is soluble in the solution of base resin in water-immiscible liquid and which in water has detergent properties, said compound being selected from the group consisting of compounds having the chemical structure of the auxiliary resin and synthetic non-ionic or anionic surfactants.

2. A method according to claim 1 wherein the hydrophilic moiety is derived from a poly(ethylene glycol) of molecular weight 600–800.

3. A method according to claim 1 wherein a hydroxyl-terminated poly(ethylene glycol) is employed as one initial component in the preparation of the auxiliary alkyd resin.

4. A method according to claim 1 wherein trimellitic anhydride is employed as one initial component in the preparation of the auxiliary alkyd resin.

5. A method according to claim 1 wherein the compound having detergent properties in water which is further incorporated into the paint has the chemical structure of the auxiliary resin.

6. A method according to claim 1 wherein the compound having detergent properties in water is a synthetic non-ionic or anionic surfactant.

7. A method according to claim 1 wherein there is employed 1–5% by weight of the compound having detergent properties in water.

8. A method according to claim 1 wherein the water immiscible liquid comprises aliphatic hydrocarbon.

9. A method according to claim 1 wherein the pigment is treated in dispersion in water-immiscible liquid with auxiliary resin alone or with a blend of auxiliary resin and a proportion of base resin.

10. A paint composition when prepared by the method according to claim 1.

* * * * *